April 10, 1928.

G. F. KOLB 1,665,554

CLUTCH

Filed April 3, 1923

INVENTOR
George F. Kolb
BY
Meyers & Cavanagh
ATTORNEYS

Fig.2.

Patented Apr. 10, 1928.

1,665,554

UNITED STATES PATENT OFFICE.

GEORGE F. KOLB, OF FAIRFIELD, CONNECTICUT, ASSIGNOR TO THE BULLARD MACHINE TOOL COMPANY, OF BRIDGEPORT, CONNECTICUT, A CORPORATION OF CONNECTICUT.

CLUTCH.

Application filed April 3, 1923. Serial No. 629,578.

My invention relates to friction clutches especially adapted for motor vehicle service, although not limited to such uses.

An important object of the invention is to provide a substantially or entirely self-contained or unitary clutch structure which may be quickly and easily installed in the proper location in a motor vehicle and which is readily adaptable with or without simple and inexpensive modifications to various types or forms of engine fly-wheels or to other varying structural features of motor vehicles.

Another object is to provide a clutch of suitable form for motor vehicle service in which the parts are very simple, strong, durable and are moreover designed for economical manufacture.

Another object is to provide driving and driven plates or disks of substantial thickness and durability and at the same time to provide for very effective dissipation of heat occasioned by clutch slippage.

Other important objects are to provide a clutch structure embodying some or all of the foregoing objects or advantages and in which a great majority of the parts and by far the greater portion of the weight of the clutch are connected to move with the flywheel of the engine or other driving element, and the driven members of the clutch are very few and of light weight, being limited preferably to the driven disk or disks and their carrier; to provide a complete housing or enclosure for the clutch structure; to provide a new and improved type of adjustment for the release mechanism which may be used in some cases; to arrange the driven clutch members or disks for either tooth or pin engagement with their carrier or driven spider; and to provide a shifter or clutch releasing member which may in some cases have direct sliding engagement with the clutch shaft or may in other cases be slidably mounted in the clutch structure proper and entirely clear of the shaft.

The characteristics and advantages of the invention are further sufficiently explained in connection with the following detail description of the accompanying drawings which show certain representative embodiments of the invention. After considering these, persons skilled in the art will understand that other variations may be made within the scope of the invention, and I contemplate the employment of any structures which are properly within the scope of the appended claims.

Reference is made to copending application, Ser. No. 629,579, filed April 3, 1923, for bearing for clutch releasing devices and other purposes, which discloses and claims the shifter and thrust bearing disclosed in the present application.

Figure 7 shows a different form of clutch, especially with regard to the mode of supporting the shifter sleeve.

Figure 8ª is a section in detail on the line 8ª—8ª, Fig. 8.

Figures 1, 3:
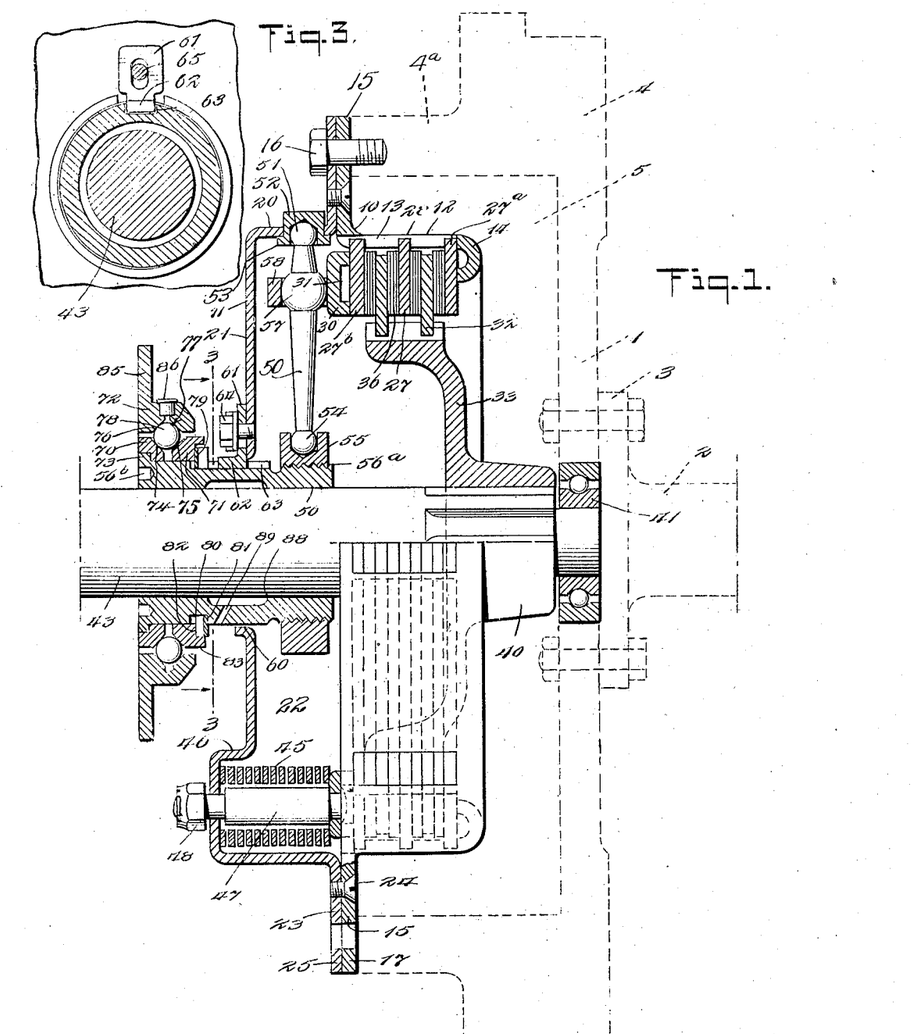
Figure 1 is a longitudinal section of a clutch embodying the invention in one form.
Figure 3 is a detail view in section at 3—3, Fig. 1, of means for connecting the shifter sleeve revolubly with the rear housing.
Figure 2:
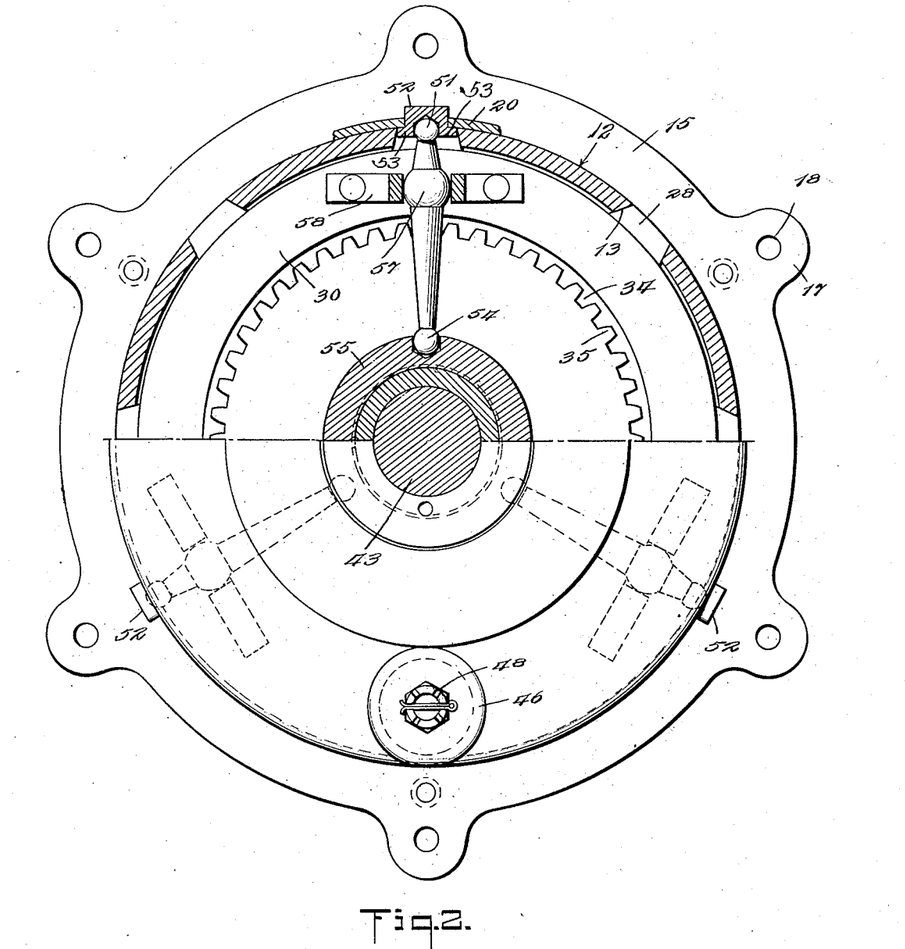
Figure 2 is a composite view, one-half in rear elevation and one-half in section.

Figures 1, 2 and 3 show one preferred embodiment of the invention in which the clutch is adapted or arranged for ready application to one well known type of flywheel. The engine flywheel shown in dot and dash lines includes a web 1 secured to the engine crank shaft 2, usually by bolting it to a flange 3 on the shaft. The flywheel rim 4 is in this case arranged in relation to the web so that a space or chamber 5 is provided in the rear face of the wheel, this space being of considerable depth. Flywheels of this general form are known as drum flywheels and various types of clutches have been designed so that parts of the clutch structure are located within the chamber 5, but such clutches have not usually been designed as unitary structures and so that they are also readily adaptable to other locations, but on the contrary usually include a greater or less number of parts or attachment devices that are more or less independently secured to the flywheel so that the clutch structure as an entirety is not self-contained or independent of the flywheel on which it is mounted.

My invention in one form as adapted for drum type and similar flywheels includes a frame-work or casing in which substantially all, or preferably all of the parts of the clutch mechanism are included as an operative unit and may be supported, handled, and put in position on the flywheel and in relation to other parts of a motor vehicle structure as such with a minimum amount of labor and practically no chance of error in the mounting operation. In the embodiment shown the casing referred to comprises a forward housing or driving member 10 and a rear housing 11, each of which is designed so that it may be produced by pressing or stamping operations from flat sheet metal at very low cost and with a minimum number of machining operations. The driving member comprises a cylindrical portion 12 slotted and formed to provide a plurality of spaced longitudinal channels or splineways 13. In the front or inward end of the cylindrical portion the metal is pressed or rolled inwardly to provide a flangelike disk abutment 14. At a suitable longitudinal location on the driving member with regard to the form of flywheel or other driving element on which the clutch is to be mounted, the driving member is provided with means for securing it to the flywheel, this means consisting in the present embodiment of a flange 15 located at the rear or open end of the driving housing. The flange is arranged to receive bolts or cap screws 16 by which it is secured to the rear flat face of a flywheel rim member 4ª. For this purpose in the present instance the flange is provided with a suitable number of ears 17 bored to provide bolt holes 18 through which the bolts or screws pass and engage in threaded holes drilled in the flywheel member 4ª.

The rear housing 11 is formed with an approximately cylindrical portion 20 which in conjunction with the main circular web 21 of the housing provides a space or recess 22 communicating with the interior of the driving housing 10. At the forward end of the cylindrical portion 20 is a flange 23 in face contact with flange 15 and secured to the latter by bolts or screws 24, and desirably also flange 23 is provided with ears 25 corresponding to ears 17 of flange 15 and similarly bored so that the attachment bolts or screws 16 pass through the flange ears of both of the housing members and rigidly secure them to the flywheel.

One or a suitable plurality of annular or ring shaped driving disks 27 are located in the cylindrical portion of the driving member. These disks are of a suitable metal or alloy such as cast iron and are preferably of substantial thickness much greater than the plates or disks commonly employed in disk clutches for reasons explained hereafter. The peripheries of the driving disks have a fairly close sliding fit in the driving member so that they are properly centered therein without any considerable radial play. Each disk has spaced radial splines 28 engaging in the splineways 13 and having a fairly close sliding fit therein. While the inward friction driving surface might be in the form of a flange formed in the driving member in place of the abutment 14 above referred to, more desirably the inward or forward driving member is in the form of a separate annular disk 27ª located against the abutment. The outward or rearmost friction driving member is not necessarily similar to the other driving disks but may desirably be an annular disk 27ᵇ substantially similar to the other driving disks such as 27, but it may be in some cases somewhat thicker. This outward driving disk may in some cases itself be, or it may be combined with, a suitable pressure member. Desirably as in the present embodiment, however, a distinct and separate pressure member in the form of an annulus or ring 30 is provided, arranged to bear against the rearward driving disk 27ᵇ and having an annular chamber 31 in its engaging face for the sake of lightness. The periphery of this pressure member has a fairly close sliding fit in the cylindrical portion of the driving member so that the pressure ring is slidably centered therein.

One or a suitable plurality of driven plates or disks 32 are arranged between friction driving surfaces or driving disks, the number of driving and driven members depending on the torque load and the amount of spring pressure provided. The length of the cylindrical driving portion 12, of course may be varied in some cases in accordance with the number of disks. The driven disks are slidably and non-rotatably engaged with a carrier or spider 33, the form of disk connection in the present instance being a tooth connection, including inter-fitting teeth 34 and 35 of more or less approximate gear-tooth form on the driven disks and the periphery of the spider respectively. The driven disks are of metal and of substantial thickness, much greater than that of the ordinary driven disks or plates, and usually substantially the same thickness as the driving disks. While the metal driving and driven disks may in some cases have direct contact, more desirably as shown an annular or ring shaped friction disk 36 of suitable friction material such as asbestos fabric or composition, is placed between each adjacent driving and driven surface.

These friction rings may in some cases be connected to driving or driven disks in the usual way but preferably, for reasons explained hereafter, these friction rings are not connected to the driving or driven disks but are entirely free therefrom and are made of substantial thickness to provide necessary strength and wearing qualities. The outer diameter of the friction rings is such that they have a fairly close sliding fit in the cylindrical driving member 12 and are therefore properly centered therein and revolve without any appreciable radial play.

The hub 40 of the driven spider 33 may be variously located with regard to the type of flywheel and other characteristics of the vehicle in which the clutch is mounted. In the present instance the hub projects forward from the web of the spider since there is ample room for this arrangement in the motor vehicle location shown in this example. The front end of the hub in this case is close to or in contact with a member of an anti-friction bearing 41, this bearing being in accordance with standard motor vehicle construction, located in a recess at the center of the flywheel web. The bearing supports the forward end of the driven clutch shaft 43 which in many cases is at the same time the driving shaft of transmission mechanism located just behind the clutch, or otherwise shaft 43 may be any suitable transmission shaft leading to the gear box, wherever the latter is located.

The forward end of the clutch shaft 43 is usually provided with a plurality of splines and the spider hub 40 is internally splined to correspond with the spline arrangement of the shaft. Various clutch-spring arrangements may be provided, but preferably clutch engagement is effected by a suitable plurality of direct acting helical springs 45, the outer ends of which are located in sockets 46 in the rear housing and the inward ends bear against the pressure plate 30. Each spring is retained or alined by a spring bolt 47 having its inward end riveted into the pressure plate and having its threaded outer end located in a hole at the center of socket 46. Desirably a nut 48 with suitable locking means is screwed on each bolt outside of the housing, and these nuts are normally adjusted so that they have a substantial clearance from the housing to permit proper spring action. When it is desired to restrain the spring action, for instance, in assembling the clutch, the nuts may be screwed up until the springs are fully compressed and then the clutch may be assembled or dis-assembled without any annoyance caused by spring pressure.

A suitable plurality of releasing levers 50 are provided, these being equally spaced and located between the springs. The levers may conveniently be of round section at every point, and especially at the bearing points, this feature enabling the levers to be very cheaply manufactured and put in position in assembling the clutch with a minimum amount of labor and attention to their proper position, and in fact the levers are not actually connected to any part of the clutch structure but are held in place by the sockets or bearing members provided as will now appear. Each lever has a rounded or substantially ball shaped outer end 51 fitting in a socket member 52 provided with a flange 53. The socket members are simply inserted in holes in the cylindrical portion 20 of the rear housing in which they have a press fit, and are restrained from outward displacement by their flanges. The inner end 54 of each lever is rounded or substantially ball shaped and fits in a socket of a releasing member, these sockets being in the present embodiment formed in a ring 55 which has screw threaded engagement with the inward end of the shifter sleeve 56. At a suitable point between the ends of the lever, to give the proper releasing leverage, each lever is provided with a rounded or ball shaped portion 57 engaging in a socket provided on the pressure plate 30. In the present example these sockets consist of suitable recesses in the centers of clips 58 secured to the rear face of the pressure ring by screws or rivets.

The shifter sleeve may be variously arranged or mounted. In the present example it is slidably supported on the clutch shaft 43 and a central portion of the sleeve is accommodated by a flanged aperture 60 at the center of web 21 of housing 11. While the following feature may sometimes be dispensed with, it is usually desirable for many reasons to connect the shifter sleeve to rotate positively with the driving members of the clutch. For that purpose a fitting in the form of a small plate 61 is secured to web 21 and an angular toe portion 62 of this fitting engages in a channel or splineway 63 cut in the outer surface of the sleeve. To prevent any binding of this driving fitting it may be secured by a screw 64 passing through a somewhat elongated slot 65 in plate member 61 so that the toe portion 62 may be properly located in channel 63. When this driving connection is provided the clutch sleeve is positively driven along with the housing members. The inner and outer ends of the levers are also positively located and driven and disalinement of the levers is thus prevented with the simple kind of lever mountings above described.

Figures 2, 9, 10, 11:
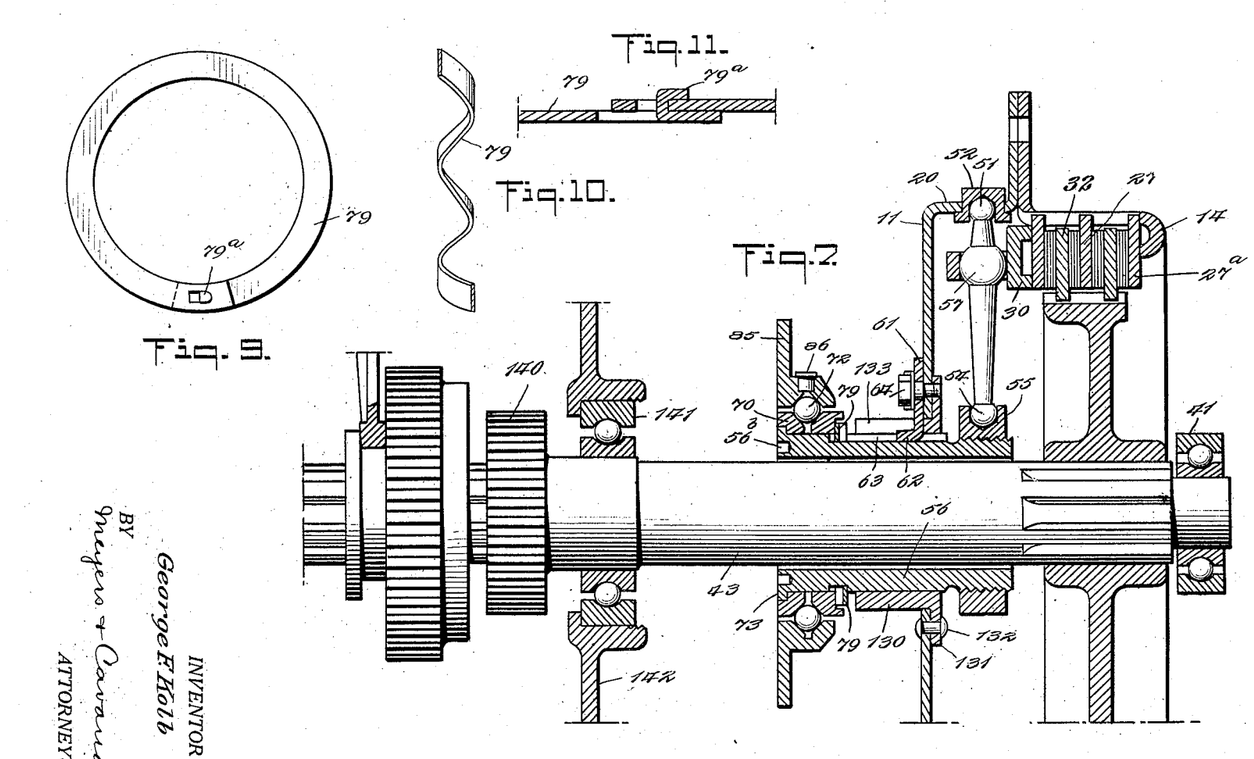
Figures 9, 10 and 11 are detail views of a yieldable retaining or locking ring for the throw-out bearing.

Various forms of throw-out or shifter bearings may be employed but desirably a new and improved type of bearing having structural features related to other features of the clutch is provided as shown in Figures 1 and 2. This bearing includes inner rings or race members 70 and 71 and an outer ring or race member 72. The bores of rings 70 and 71 have a close fit on the cylindrical outward portion of sleeve 56 which is of sufficiently larger diameter than the threaded inner end of the sleeve to permit the rings to be passed over that end of the sleeve in assembling the device. Ring 70 is countersunk to cooperate with a flange 73 on the outer end of the sleeve. The ball races may in some cases be of curved cross section, but more desirably they are flat for economy in manufacture and because flat races are satisfactory for this service. Ring 70 therefore has a flat angular race 74; ring 71 has a similar race surface 75, and ring 72 has confronting flat race surfaces 76 and 77. Preferably no ball spacer is employed and the ball space between the races is provided with a full complement of balls 78 which are inserted after ring 70 is put in position and ring 72 is located properly in relation to it and before ring 71 is positioned. Ring 71 is held in place by an annular spring clip 79 of sinuous or wavelike formation, Figures 9, 10 and 11. The clip is split at one part of its periphery and is inserted in an annular recess 80 so that portions of the spring clip bear against a shoulder 81 of the recess and other portions bear against a radial face 82 of the bearing ring, and the ring may also have a flange 83 partly encircling the clip. The ends of the spring clip may be secured together by a suitably bent tongue 79ª formed on one end portion and passing through a slot in the other end portion. The outer ring is provided with a flange 85 adapted to be engaged by any suitable or usual type of shifting yoke. Any suitable oiler fitting 86 may be inserted in the outer ring in communication with the raceway and the shape of the outer raceway composed of the race surfaces 76 and 77 is such that a considerable amount of lubricant is effectively retained. The construction of this bearing, including the yieldable retaining ring or spring clip, is such that manufacturing cost can be considerably reduced since exact accuracy in the location of the race surfaces in relation to other portions of bearing races is not essential, any variations in this respect being automatically compensated for in the positioning of ring 71 in relation to the other rings when the bearing is assembled. Any active thrust on the bearing is in the direction tending to move the race surface 77 toward the race surface 74 which is carried by a positively located ring, and the spring retainer is therefore not subject to any active stresses and only serves to properly locate and retain the bearing parts.

Desirably the shifter sleeve has a central annular recess 88 provided with an oil hole 89 for the effective lubrication of the sleeve when it is arranged as in the present instance to slide upon the clutch shaft.

In many cases it is unnecessary to provide for any adjustment of the clutch during the life of a vehicle in which it is placed. This is particularly true because of the construction and arrangement of the friction members including the unattached friction rings 36 and the thick and substantially rigid driving and driven disks. The disks may be machined or ground to produce true flat surfaces and are sufficiently rigid to avoid distortion so that the full flat bearing surfaces are maintained in contact with the friction rings. Similarly the friction rings are preferably faced off smooth or are rubbed down to a compact bearing surface before being placed in the clutch. Friction contact then exists all over the engaging faces of the disks and rings, this surface being uninterrupted by any rivet openings which in ordinary clutch construction tend to accumulate material worn from the disks, and this material tends to build up in the rivet openings and to project beyond the surfaces, and the friction material then wears annular grooves or scratches in the adjacent metal surfaces with the result that the desired friction engagement is very much reduced. Not only is the maximum friction surface maintained by my arrangement, but wear is materially reduced, the total wear on the plurality of surfaces being insufficient over a long operating period to cause any considerable inward movement of the inner ends of the releasing levers, and such slight inward movement is automatically compensated for by the slight play between the shifter yoke and flange 85 or by other lost motion in the linkage from the clutch pedal to the shifter. In some cases, however, it is desired to provide for adjustment and in the present instance for this purpose ring 55 is made separate from the shifter sleeve and is mounted on a screw threaded inward portion 56ª thereof. Adjustment is easily effected by moving the locking member 61 to free its toe 62 from the channel 63, and turning the clutch sleeve one revolution and then re-inserting the locking member or toe 62 in channel 63; or, if a plurality of these channels are provided, the sleeve may be turned less than one revolution. To facilitate the turning of the shifter sleeve it may be provided with any suitable means, such as sockets 56ᵇ, to receive a suitable tool such as a spanner.

The splineways 13 in the driving member are in the present example spaced considerably apart, this being possible largely because of the thickness of the driving disks and of their spline members or teeth engaging in the splineways, this thickness being sufficient to prevent cutting of the sides of the splineways by the teeth such as occurs frequently in ordinary disk clutches on account of the thinness of the plates and the small bearing surface provided. On account of the total absence of cutting the plates slide freely in the channels throughout the life of the clutch, and any objectionable rotative play is prevented. Of course the number of splineways may be increased and they may be placed closer together by a corresponding rearrangement of the projections on the disks, and in that case the structure will resemble in this respect the ordinary tooth drive arrangement exemplified in the present instance by the mode of connecting the driven disks to their carrier.

The thick disks with their correspondingly thick projections engaging the driving and driven members respectively, have another important advantage in that the ample metallic contact thus afforded enables the heat of friction to be readily dissipated through the driving and driven members and so to the flywheel and shaft and radiated away so that even after severe slipping there is very little appreciable heat. This of course in turn reduces the wear of the friction members and has other obvious advantages.

The clutch is easily assembled in an obvious way with very little care being required since the parts almost automatically assume their proper positions. For instance, before the two housing members are connected the friction disks and rings are simply dropped into position in the cylindrical portion of the driving housing, whereupon the inward disk 27ᵃ rests against the abutment 14. After the socket members 52 are placed in the outer housing the releasing levers are passed through the apertures or sockets 58 of the pressure plate 30, which has the spring bolts attached to it, and the bolts are passed through the springs which are properly positioned in sockets 46. The inward ends of the releasing levers are inserted in the sockets of ring 55 which is screwed onto the inward end of the shifter sleeve and the assembly of the outer housing and related parts is completed in an obvious way. The two housing members are then secured together and the driven spider 33 is inserted in proper engagement with the driven disks. This is the only member which is not positively held in place and it may be so held for shipment by means of a cord or wire.

Flywheels of various types, including the drum type shown in Fig. 1, are more or less standardized and a large number are in use arranged for other forms of clutches, and some are even provided with bolt holes in a member 4ᵃ in the same location as shown in Figure 1. In applying the clutch to a motor vehicle having such a flywheel, therefore, whether in the process of original assembly or in applying the clutch as a replacement unit, it is only necessary for the workman to pass the shifter sleeve over the end of the clutch shaft, properly locate the splines of spider hub 40 on the splines of the clutch shaft, insert the inner end of the clutch shaft in its bearing 41, bring flange 15 of the driving member against the rear face of the flywheel, and insert and set up screws 16. The clutch has been properly assembled and adjusted at the factory and no adjustment or further attention whatever is necessary in the assembling operation. It will be especially noted that the thrust of springs 45 is self-contained in the assembled clutch structure, and there is no need of spring adjustment after the clutch is placed in the vehicle.

The releasing levers are not connected to any other parts by pivot pins or like devices so that the expense of manufacture and cost of assembling is very much reduced, and at the same time the levers are positively held in position and in radial alinement, and they are also free to rotate slightly on their own axis so that any slight wear which might occur on their bearing surfaces is well distributed and is of no consequence during the life of the clutch.

Figure 4:
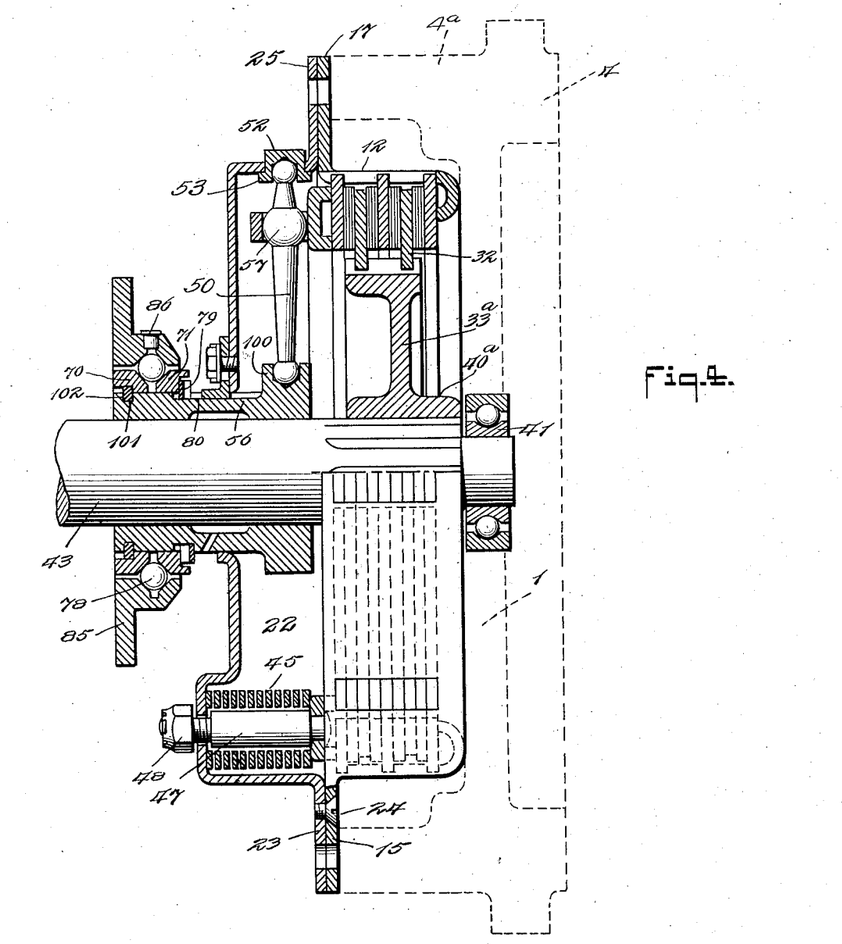
Figure 4 is a longitudinal section of a slightly modified clutch arrangement, showing also a modified shifter and thrust or throw-out bearing.

Figure 4 shows the clutch adapted by very slight changes to another style of drum flywheel in which the rear face of the flywheel web is nearer to the rear face of the rim, or in other words the recess in the flywheel is shallower. The depth of the cylindrical portion 12 of the driving member may be made such that it will be accommodated in practically any type of drum flywheel even when two or more driving disks are provided. Figure 4 shows that even with a shallow flywheel chamber a clutch dimensioned as in the previous instance is properly accommodated without any change whatever in the driving member. If, however, more plates are to be used, or if the flywheel recess is still shallower, this condition can be compensated for by moving flange 15 forward in relation to the rest of the driving member, or in some cases by placing spacers between the flange and the flywheel. When flange 15 is moved considerably forward (this term being used with reference to the location of the clutch in a motor car) a separate flange may be provided for the connection of the rear housing, an example of this being given in Figure 8 referred to later.

The only other change necessary in this case in the general clutch structure is the change in the shape of the driven spider 33ª, this change consisting mainly in locating its hub 40ª more nearly in line with its periphery, or in other words the web is more or less centered on the hub and the hub is brought closer to the normal position of the shifter sleeve.

Figure 4 also shows a modification in the shifter sleeve and its connection or relation to the releasing levers which may be employed in any case regardless of the adaptation of the clutch to any particular kind of flywheel. In this modification no clutch adjustment is provided for since such adjustment is usually unnecessary as previously explained. The sockets for the inner ends of the releasing levers are provided in a flange 100 formed integrally with or rigidly secured to the inward end of the shifter sleeve 56. In this case it is impracticable to assemble the throw-out bearing by passing its inner rings over the inward end of the sleeve. The bearing mounting is therefore modified by omitting sleeve flange 73 previously mentioned and providing the sleeve near its outer end with an annular groove 101. Ring 70 is also recessed to properly accommodate a split retaining ring 102. Before the retaining ring is inserted the inner bearing members are passed over the outward end of the sleeve, ring 71 being moved inward far enough to permit insertion of the balls. The locking ring 102 is inserted and the entire bearing is moved back until bearing ring 70 is engaged with the locking ring as shown in Figure 4, and positively holds the locking ring in position, and the locking ring at the same time prevents rearward displacement of the bearing. The spring retaining ring 79 is then inserted, completing the assembly operation. When such a form of non-adjustable shifter is provided, and the shifter sleeve is connected positively to rotate with the outer housing, the alinement of the releasing levers is made still more positive since it is impossible for the levers to get even slightly out of the proper radial position even if for example, any slight lateral displacement caused by the springs 45 should tend to rotate the pressure plate in relation to the shifter sleeve. Evidently any such movement is positively prevented by the arrangement of Figure 4.

Figure 5:
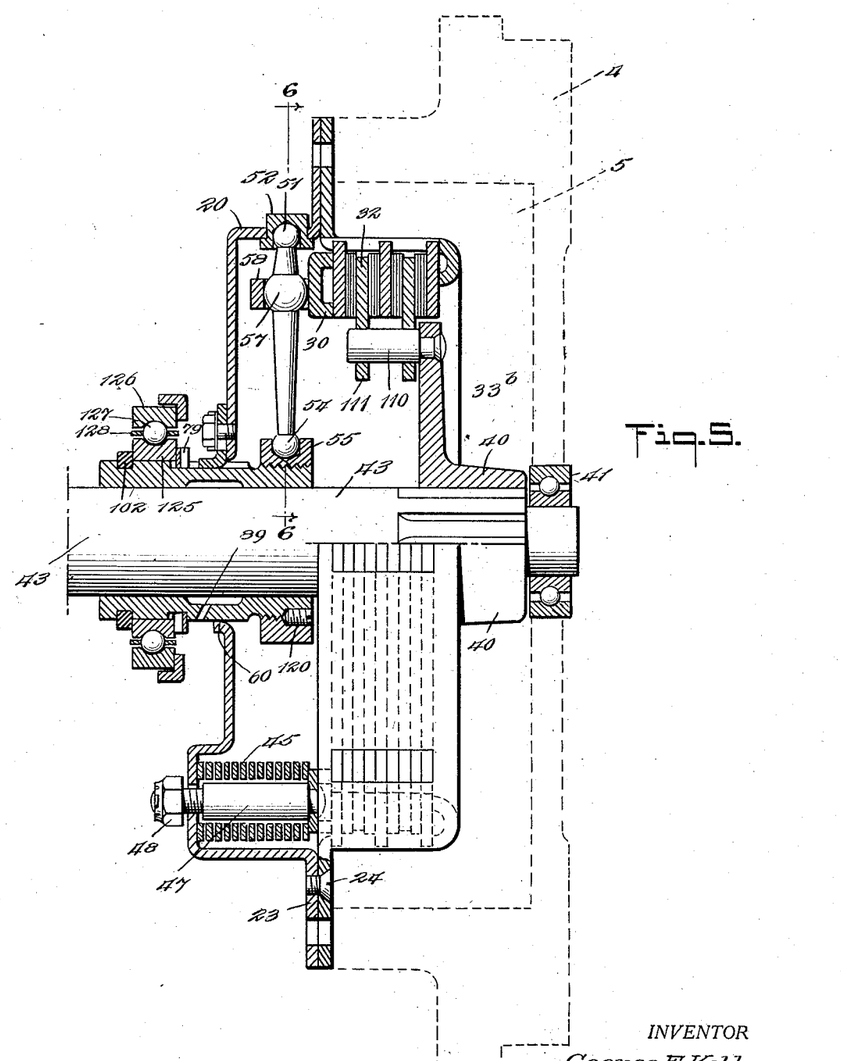
Figure 5 shows another modified form of clutch and another modified shifter and throw-out bearing.
Figure 6:
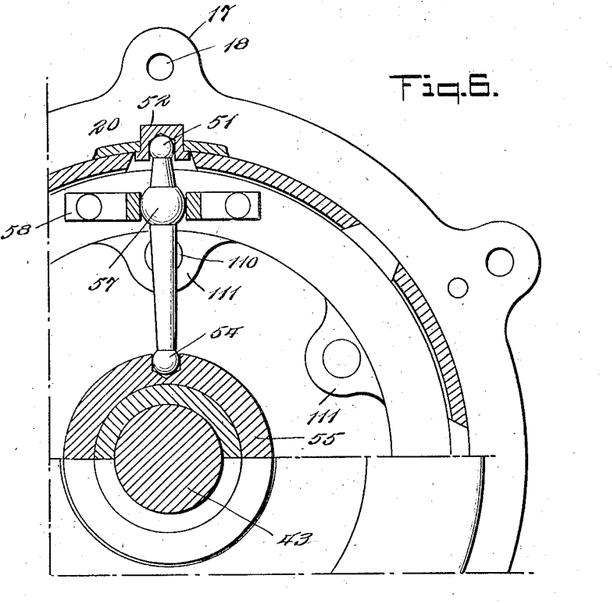
Figure 6 is a fragmentary transverse section, in the plane 6—6, of the modified clutch arrangement shown in Figure 5.

Figure 5 shows a modified form of connection between the driven disks and their carrier. This is in general conformity to the known forms of so-called pin drive, but adapted for cooperation with other features of my invention. The spider 33ᵇ is provided with a plurality of equally spaced pins 110 of substantial diameter and the driven plates are slidably supported on these pins by means of properly apertured ears 111 extending from the inner peripheries of the disks. The pins are riveted or otherwise secured in the web of the spider. While this form of driving connection is not so satisfactory in some cases as the tooth drive, it is more economical, and satisfactory in many cases. The substantial thickness of the driven disks, and especially the ears surrounding the pins, provides an ample bearing surface and prevents cutting of the pins or the ear-apertures, and the ample metallic contacting surfaces also provide for the dissipation of heat as in the previous instance. The spider hub 40 is in this case arranged substantially as in Fig. 1, but its position may be reversed or else substantially as shown in Fig. 4 to suit different flywheels or other motor vehicle locations.

Figure 5 also shows a modified throw-out adjustment consisting in a socket ring 55 having screw threaded engagement on the shifter sleeve 56 as in Fig. 1, but with the ring detachably locked to the sleeve by suitable means such as a screw stud 120 inserted in a hole bored longitudinally in the end of the sleeve and the ring 55. This makes a substantially rigid construction, absolutely preventing disalinement of the levers as explained in connection with Fig. 4, but if it is desired at any time to adjust the throw-out action, for instance, to compensate for wear of the friction surfaces, if any appreciable wear does finally occur, adjustment may be effected while the clutch is partially or entirely disassembled by removing the screw stud and turning ring 55 on the sleeve and re-inserting the stud.

Figure 5 also shows the shifter sleeve adapted for an ordinary type of thrust bearing consisting of an inner ring 125, an outer ring 126, and a series of balls 127 provided with a spacer 128. This type of bearing is retained on the outward end of the shifter sleeve by a split ring 102 and a spring ring 79 cooperating with the inner bearing ring to retain the entire bearing in position as will be sufficiently understood by the previous description of Figure 4.

Figure 7 shows a modification in which the shifter sleeve is supported entirely in the clutch structure proper and free from sliding engagement with the clutch shaft. The shifter sleeve may in this case be constructed as in any of the previous examples except that in some cases it may have a slightly longer dimension between the socket ring or flange 55 and the throw-out bearing. The rear housing 11 is provided at its central aperture with a supporting sleeve 130 in which the central cylindrical portion of the shifter sleeve is slidably mounted. The supporting sleeve might be integral with the housing but in the present instance it is a separate piece provided with a flange 131 secured to the web of the housing by screws or rivets 132. The connecting or driving member 61 to connect the shifter sleeve irrevolubly with the driving clutch structure, may be substantially as in previous examples, except that it may be made somewhat longer, and the supporting sleeve 130 has a slot 133 to accommodate the toe 62 of fitting 61 and permit it to have access to the longitudinal channel 63. In the present instance the shaft 43 is representative of one well known and standardized motor vehicle arrangement in which the forward end of this shaft has a bearing in the flywheel or in the rear end of the crank shaft and the rear end of the shaft carries a pinion 140 which is the primary driving member of the transmission gearing. The shaft is usually supported by a bearing such as 141 arranged just in front of pinion 140, and the bearing is located in a support 142 which may be a part of the casing which is operatively or actually integral with the engine base and connects the gear box thereto, this casing enclosing the engine flywheel and clutch and being commonly called a bell housing. In this arrangement, or in other cases where shaft 43 may not be alined with the greatest accuracy, or for other reasons, it may be desirable to support the shifter sleeve entirely free from the shaft. This is accomplished in the present instance in connection with the supporting sleeve 130 above mentioned, forming a part of the clutch driving structure, by merely making the inner diameter of the shifter sleeve 56 substantially greater than the diameter of the shaft, thus providing a substantial clearance between the shaft and the sleeve throughout the length of the latter, and preventing any binding of the sleeve in sliding or in any of its positions, and any strain or distortion of the clutch parts by any disalinement of the clutch shaft or by any failure to properly dimension the shifter sleeve to slidably fit the shaft. Evidently this feature may be incorporated in connection with any of the forms of the invention as shown in previous examples.

Figure 8:
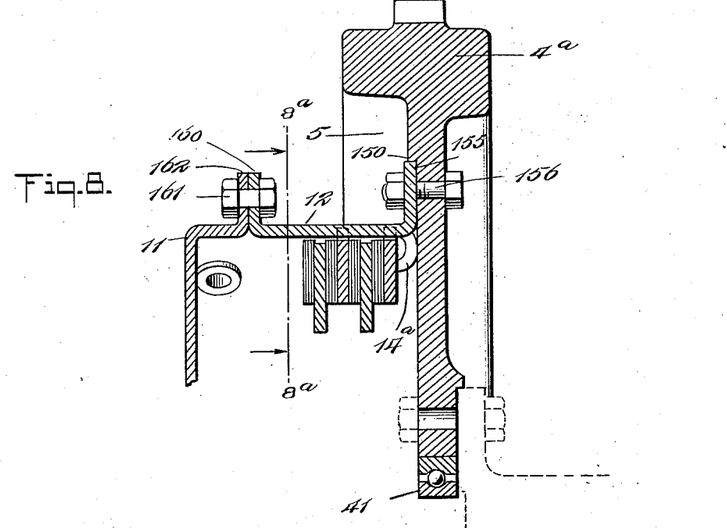
Figure 8 is a longitudinal section of another modification of clutch structure or arrangement, exemplifying one adaptation of the clutch to a particular type of engine flywheel.
Figure 8A:
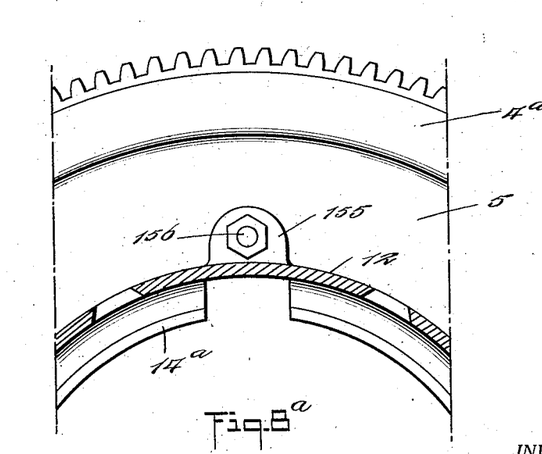

Figure 8 shows another modification which is one example of an adaptation of the clutch structure, by a simple and inexpensive change, to another motor vehicle location or mounting, and specifically to another type of flywheel in which there may be no substantial flywheel recess, or in which it is impracticable or undesirable to connect the clutch structure to the flywheel rim, and it is necessary or desirable to connect the clutch structure to the flywheel at some point inwardly from the rim, or in other words to the wheel web. Flywheels of the type shown in Fig. 8 are some times known as S. A. E. standard flywheels. Such a flywheel in the present instance has its ball or rim 4ª so far removed from the axis that it is not practicable to attach the clutch structure to the rim, and the flywheel recess or chamber 5 is moreover shallower than in certain previous examples, for instance, the form shown in Fig. 1. It is desirable therefore to secure the clutch structure to the flywheel web 1. The web may be provided on its rearward face with an annular shoulder 150. The cylindrical portion 12 of the clutch driving housing is in this case provided with a flange or with a plurality of spaced ears 155 located at the forward end of said portion and produced by bending or pressing suitably formed portions of the sheet metal housing outward. The driving housing is secured to the flywheel by screws or bolts 156 passing through the ears and the flywheel web. The abutment 14ª corresponding substantially to the plate abutment 14 described in connection with Fig. 1, is formed in this instance by bending in portions of the housing intermediate the ears 155. A flange or a series of spaced ears 160 are provided at the rear end of the driving housing for the connection of the rear housing 11 by means of screws or bolts 161, the rear housing in this case being provided with a flange 162 or a spaced series of ears corresponding to the complemental flange or ears on the driving housing. Other features of this design may be in conformity with any of the previous examples.

It will be evident from the preceding description that the clutch structure in any of its several forms is adaptable without change to various forms of flywheels or other more or less standardized motor vehicle locations, and that by simple and inexpensive changes the structure can be further adapted to other types of flywheels or other motor vehicle designs. The clutch is therefore especially available for the replacement of other forms or types of clutches in existing vehicles as well as for easy and economical mounting in new cars in the process of assembly.

Figure 12:
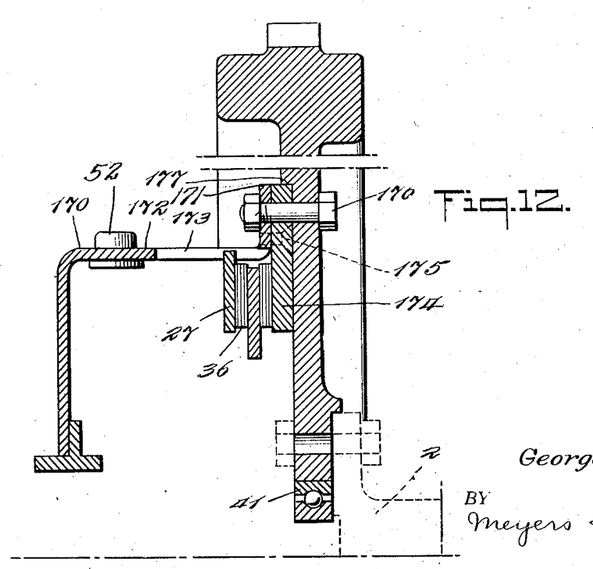
Figure 12 is a sectional view of another modified form of clutch adapted for certain flywheel locations.

Figure 12 shows another modified form of clutch especially well adapted for mounting on the flywheel web in general accordance with the mounting arrangement described in connection with Figure 8. In the present instance, however, the clutch frame or housing 170 is made in a single piece, usually of pressed metal, and provided at its forward end with an attachment flange 171. The cylindrical portion 172 of the housing is provided with splineways 173 extending inward from the forward end of the housing a suitable distance and the driving and driven disks are inserted in the housing from its open end with their spline members in the splineways after the other parts, such as the springs and levers and the pressure plate, have been put in position. A driving member or abutment in the form of an annular plate 174 is provided to cooperate with the forward driven disk or the interposed friction ring. Desirably this abutment plate is secured to the housing as by screws 175, thus providing a self-contained or unitary structure as in the previous examples; and desirably also the annular plate 174 is wide enough to extend to the periphery of flange 171, and bolts 176, which secure the clutch to the flywheel, pass through both the flange 171 and the outward part of plate 174. The flywheel is usually provided with an annular shoulder 177 of standard radius, and plate 174 and flange 171, or at least one of them, is dimensioned to fit within or against this shoulder and against the flat face of the flywheel web so that the clutch structure is positively centered. Other features of this form of the invention may be as described in connection with various other figures of the drawings.

The term "housing" as used herein is not necessarily limited to an element which completely encloses the clutch parts, although usually it is desirable to arrange the housing so that it affords a complete enclosure for working parts of the clutch which would otherwise be exposed at the rear face of the flywheel when the clutch is mounted. In its broader significance the term "housing" is intended to include a frame member or frame work to support or carry the various clutch parts, usually in substantially unitary or self-contained arrangement.

The terms "front" and "rear" or equivalent terms, are not used primarily as limitations but to conveniently explain relative locations of parts, particularly with reference to the usual location of a clutch in a motor vehicle. The clutch structure is of course equally well adapted for use in motor boats in which the engine flywheel is frequently arranged substantially as in a motor vehicle and a clutch is required to disconnect the motor from the propeller shaft.

I claim:

1. A substantially unitary friction clutch adapted for application to various existing motor vehicle flywheels and clutch shafts and comprising a forward housing, one or more annular driving disks therein and having splined engagement therewith, a disk abutment, an annular pressure plate centered by the housing, a rear housing connected to the forward housing, a shifter sleeve centered in relation to the rear housing, a plurality of releasing levers fulcrumed in sockets in the rear housing and having pivotal engagement with the pressure plate, the inward ends of the levers pivotally engaging in sockets carried by an inward portion of the shifter sleeve, means connecting the shifter sleeve to revolve with the rear housing and permitting longitudinal movement, one or more annular driven clutch disks located between said driving disks, a spider having a slidable and irrevoluble connection with the driven disks and also arranged for irrevoluble connection to a clutch shaft or other driven shaft, a plurality of direct acting compression springs between the rear housing and the pressure plate, and a spring rod passing through each spring and connected to the pressure plate and passing movably through a hole in the rear housing.

2. A substantially unitary friction clutch adapted for application to various existing motor vehicle flywheels and clutch shafts and comprising a forward housing, means thereon located in suitable position longitudinally of said housing for attaching it to a particular type or shape of engine flywheel, one or more annular driving disks in said housing and having splined engagement therewith, a disk abutment, an annular pressure plate slidably centered in the housing, a rear housing member connected to the first named housing, a shifter sleeve centered in the rear housing, a plurality of releasing levers fulcrumed in sockets provided in the rear housing member and having pivotal engagement with the pressure plate, the inward ends of the levers pivotally engaging in sockets carried by an inward portion of the shifter sleeve, means positively connecting the shifter sleeve to revolve with the rear housing member and permitting longitudinal movement, one or more annular driven disks located between said driving disks, a spider having a slidable and irrevoluble connection with the driven disks and also arranged for irrevoluble connection to a clutch shaft or other driven shaft, a plurality of direct acting compression springs between the rear housing member and the pressure plate, a spring bolt passing through each spring and connected to the pressure plate and passing movably through a hole in the rear housing member, and a nut on the spring bolt outside the housing member adjustable to permit normal spring action or to compress the spring and relieve the disks of pressure.

3. In a friction clutch suitable for motor vehicles and similar purposes, a housing member of pressed metal having peripheral means for connection to a driver, one or more sockets therein to receive the outer ends of releasing levers, a shifter sleeve arranged for longitudinal sliding movement in a central aperture in said housing, said sleeve having a longitudinal channel, and a member detachably secured to an outer face of the housing and engaging in the channel to prevent relative rotation of the sleeve.

4. A friction clutch for motor vehicles and like uses comprising a driving member of pressed sheet metal including a cylindrical portion and a peripheral flange, the cylindrical portion having longitudinal splineways, a rear housing member of pressed sheet metal having a peripheral flange and adapted to be secured to the flange of the driving member, the housing member being dished to provide a recess to accommodate releasing levers and clutch springs.

5. A friction clutch for motor vehicles and like uses comprising a driving member of pressed sheet metal including a cylindrical portion, a peripheral flange and a disk abutment at the inner end of the cylindrical portion, the cylindrical portion having longitudinal splineways, a rear housing member of pressed sheet metal having a peripheral flange and adapted to be secured to the flange of the driving member, the housing member being dished to provide a recess to accommodate releasing levers and clutch springs.

6. A friction clutch comprising a rear housing member having a peripheral flange for attachment to a driver, a substantially cylindrical portion and a substantially flat rear portion defining a chamber within the housing member, separate socket members inserted by outward radial movement in apertures in said cylindrical portion, said sockets having inwardly located flanges engaging against said cylindrical portion to resist centrifugal displacement, releasing levers pivotally mounted in the socket members and retaining them in position, a pressure plate, and lever brackets connected to the plate and providing other sockets for the levers, the levers having substantially ball-shaped portions engaging in said sockets.

7. A friction clutch comprising a rear housing member having a peripheral flange for attachment to a driver, a substantially cylindrical portion and a substantially flat rear portion defining a chamber within the housing member, lever sockets inserted by outward radial movement in apertures in said cylindrical portion, the sockets having inwardly located flanges engaging against said cylindrical housing portion to resist centrifugal displacement, releasing levers pivotally mounted in the sockets and retaining them in position, an annular pressure plate, lever brackets connected to the plate and providing sockets for the levers, the levers having substantially ball-shaped portions engaging in said sockets and free to move radially therein, and a shifter provided with sockets, the levers having ball-ends located in said shifter sockets, and the levers being retained in radial alignment and longitudinal position by the described socket arrangement without positive attachment.

8. A friction clutch comprising a driving member adapted to be secured to a driving element of a motor vehicle such as a fly wheel, one or more annular driving disks therein, one or more cooperating annular driven disks, a rear housing connected to the driving member, a plurality of annularly spaced helical compression springs, each spring having one end located against the housing, an annular pressure member, spring bolts, one for each spring, the inward end of each bolt being connected to the pressure member, the bolt passing through the adjacent spring and passing slidably through an aperture in the housing, and a nut on the spring bolt outside the housing.

9. A friction clutch comprising a driving member adapted to be secured to a driving element of a motor vehicle such as a flywheel, one or more annular driving disks therein, one or more cooperating annular driven disks, a rear housing connected to the driving member, a plurality of annularly spaced helical compression springs, each spring having one end located in a socket in the housing, an annular pressure member, spring bolts, one for each spring, the inward end of each bolt being connected to the pressure member, the bolt passing through the adjacent spring and passing slidably through an aperture in the housing socket, and a nut on the spring bolt outside the housing.

Signed at New York city in the county of New York and State of New York this 16th day of March A. D. 1923.

GEORGE F. KOLB.